United States Patent
Jacob et al.

(10) Patent No.: US 12,418,411 B2
(45) Date of Patent: Sep. 16, 2025

(54) AUTO EXPIRING MULTI-TENANT MULTI-ENTITY SLIDING WINDOW EVENT COUNTER

(71) Applicant: Freshworks Inc., San Mateo, CA (US)

(72) Inventors: Bivil Mavilayil Jacob, Kottayam (IN); Salai Vinoth Sa, Tiruchirappalli (IN)

(73) Assignee: Freshworks Inc., San Mateo, CA (US)

( * ) Notice: Subject to any disclaimer, the term of this patent is extended or adjusted under 35 U.S.C. 154(b) by 115 days.

(21) Appl. No.: 18/439,856

(22) Filed: Feb. 13, 2024

(65) Prior Publication Data
US 2025/0260567 A1    Aug. 14, 2025

(51) Int. Cl.
*H04L 9/08*    (2006.01)
(52) U.S. Cl.
CPC .......... *H04L 9/0872* (2013.01); *H04L 9/0822* (2013.01)
(58) Field of Classification Search
CPC .............................. H04L 9/0872; H04L 9/0822
See application file for complete search history.

(56) References Cited

U.S. PATENT DOCUMENTS

| | | | | |
|---|---|---|---|---|
| 9,779,269 | B1 * | 10/2017 | Perlman | G06F 16/2291 |
| 2014/0050317 | A1 * | 2/2014 | Sabin | H04L 9/0894 |
| | | | | 380/44 |
| 2019/0057101 | A1 * | 2/2019 | Esserlieu | G06F 3/0604 |
| 2021/0110055 | A1 * | 4/2021 | Miller | H04L 63/10 |
| 2022/0334884 | A1 * | 10/2022 | Kulkarni | G06F 16/256 |
| 2023/0336339 | A1 * | 10/2023 | Karadigudda | H04L 9/0894 |

FOREIGN PATENT DOCUMENTS

| | | | | |
|---|---|---|---|---|
| CN | 108108416 | * | 6/2018 | G06F 16/215 |
| CN | 117319485 | * | 12/2023 | H04L 67/51 |

OTHER PUBLICATIONS

Chen et al.; "EnclaveCache: A Secure and Scalable Key-value Cache in Multi-tenant Clouds using Intel SGX", 2019, ACM, pp. 14-27. (Year: 2019).*
Kalim et al.; "Henge: Intent-driven Multi-Tenant Stream Processing", 2018, ACM, pp. 249-262. (Year: 2018).*

* cited by examiner

*Primary Examiner* — Matthew Smithers
(74) *Attorney, Agent, or Firm* — LeonardPatel PC; Sheetal S. Patel; Michael A. Leonard, II

(57) ABSTRACT

A computer-implemented method performing an auto expiring multi-tenant multi-entity sliding window event counter includes defining a dynamic key for a key value pair uniquely created for a tenant per day in any key value store. The method also includes storing a hash associated with the dynamic key. The hash includes an entity identification (ID) as a key and an event count as a value, and upon a valid event for an entity of the tenant, identifying a tenant level key for a day and incrementing the value of the entity ID. The method further includes retrieving a sum of counts over the predefined period of time for each entity identified with the entity ID for the tenant, and performing automated key deletion/cleanup after expiration of the predefined period of time set as expiry for the key.

20 Claims, 9 Drawing Sheets

AUTO EXPIRING MULTI-TENANT MULTI-ENTITY SLIDING WINDOW EVENT COUNTER

FIELD

The present invention relates to an auto expiring multi-tenant multi-entity sliding window event counter.

BACKGROUND

A tenant may refer to an account signed up in a software product, and an entity refers to any product feature (e.g., workflow automation). For example, a use case is of a SAAS (Software As A Service) software product (or application), such as Freshsales® or a customer relationship management (CRM) application of Freshworks®. There may be a multi-tenant architecture where, for every account signed up for the Freshsales® CRM application, there is a multi-tenant implementation on the backend. Each of these tenants or accounts may have custom configured workflow automations in their account, which may be referred to as entities.

The use case keeps track of the count of events that are occurring through workflow automations for each account or tenant per workflow automation. These workflow automations conditionally trigger the respective automation actions for every record CRUD (Create, Read, Update and Delete) operation that occurs in the system. For example, there is a trigger for every lead being created or a contact that is being converted to a deal. When these events occur, there is a set of custom written workflow automations that performs certain actions such as updating a contact or sending a communication.

There is a use case that keeps track of event counters from a predefined period of time. The predefined period of time may be the past 7 days, 14 days, etc. Although there are technologies such as a time series table or a key value store, the current technology requires additional computational overhead. With a time series table, every event is recorded in the time series table according to the time of the event. Based on the times, aggregations and counts are computed. However, a time series table may require the storage of unnecessary data in the table itself, thereby increasing data storage and requiring data cleanup. Also, with a time series table, aggregate queries are infra-intensive and time consuming.

Key value store, for example, does not solve for the use case efficiently and accounting for a tenant account time zone increases the overhead. For example, with accounts being in different time zones, the key value store is not sufficient. The key-value stores and the inherent data structures, such as hashes, that they support by default will not account for time or date based value storing. For this limitation, the key construction logic needs to be programmatically tweaked to factor in the time zone/date constraints.

Solving this in an efficient manner without computational overhead is the goal; however, there are no existing library or reference solutions that execute the exact same case. Further, there is a need for a mechanism (or algorithm) that efficiently captures a number of events triggered per entity per tenant on a sliding window manner taking into account the tenant time zone in all computations. Thus, an alternative approach may be beneficial.

SUMMARY

Certain embodiments of the present invention may provide solutions to the problems and needs in the art that have not yet been fully identified, appreciated, or solved by current customer relationship management (CRM) systems. For example, some embodiments generally pertain to an auto expiring multi-tenant multi-entity sliding window event counter that helps with aggregate events metrics for any specific number of days. In certain embodiments, a programming implementation is provided on top of a key value store with a key expiry capability.

In an embodiment, a computer-implemented method for performing an auto expiring multi-tenant multi-entity sliding window event counter includes defining, by at least one processor, a dynamic key for a key value pair uniquely created for a tenant per day in any key value store. The method also includes storing, by the at least one processor, a hash associated with the dynamic key, wherein the hash comprises an entity identification (ID) (e.g., Automation ID) as a key and an execution count as a value, and upon a valid event trigger for an entity (e.g., automaton) of the tenant, identifying, by at least one processor, a tenant level key for a day and incrementing the value of the entity ID (e.g., automation ID). The method further includes retrieving, by at least one processor, a sum of counts over the predefined period of time for each entity (e.g., automation) identified with the entity ID (e.g., automation ID) for the tenant, and performing automated key deletion/cleanup after expiration of the predefined period of time set as expiry for the key.

In another embodiment, an apparatus may include at least one processor and memory comprising a set of instructions. The set of instructions are configured to cause at least one processor to execute defining a dynamic key for a key value pair uniquely created for a tenant per day in any key value store. The set of instructions are further configured to cause the at least one processor to execute storing a hash associated with the dynamic key, wherein the hash comprises an entity identification (ID) (e.g., automation ID) as a key and an execution count as a value, and upon a valid event for an entity (e.g., automation) of the tenant, identifying a tenant level key for a day and increment the value of the entity ID (e.g., automation ID). The set of instructions are further configured to cause at least one processor to execute retrieving a sum of counts over the predefined period of time for each entity (e.g., automation) identified with the entity ID (e.g., automation ID) for the tenant, and performing automated key deletion/cleanup after expiration of the predefined period of time set as expiry for the key.

In yet another embodiment, a computer program is embodied on a non-transitory computer-readable medium. The computer program is configured to cause at least one processor to execute defining a dynamic key for a key value pair uniquely created for a tenant per day in any key value store. The computer program is further configured to cause at least one processor to execute storing a hash associated with the dynamic key, wherein the hash comprises an entity identification (ID) (e.g., automation ID) as a key and an execution count as a value, and upon a valid event trigger for an entity of the tenant, identifying a tenant level key for a day and increment the value of the entity ID (e.g., automation ID). The computer program is further configured to cause at least one processor to execute retrieving a sum of counts over the predefined period of time for each entity (e.g., automation) identified with the entity ID (e.g., automation ID) for the tenant, and performing automated key deletion/cleanup after expiration of the predefined period of time set as expiry for the key.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments generally pertain to an auto expiring multi-tenant multi-entity sliding window event counter that helps with aggregate events metrics for any specific number of days. In these embodiments, an algorithm using the capabilities of a key value store with expiry support, together with string manipulation capability of Ruby (or any other) Programming Language and mathematical logics on time computations, retrieve the aggregated counts on demand from the database (or data store). This implementation in these embodiments is generalized such that the algorithm can be used for any use cases where multi-tenant multi-entity sliding window event counter with auto expiry is a use case.

Figure 1:
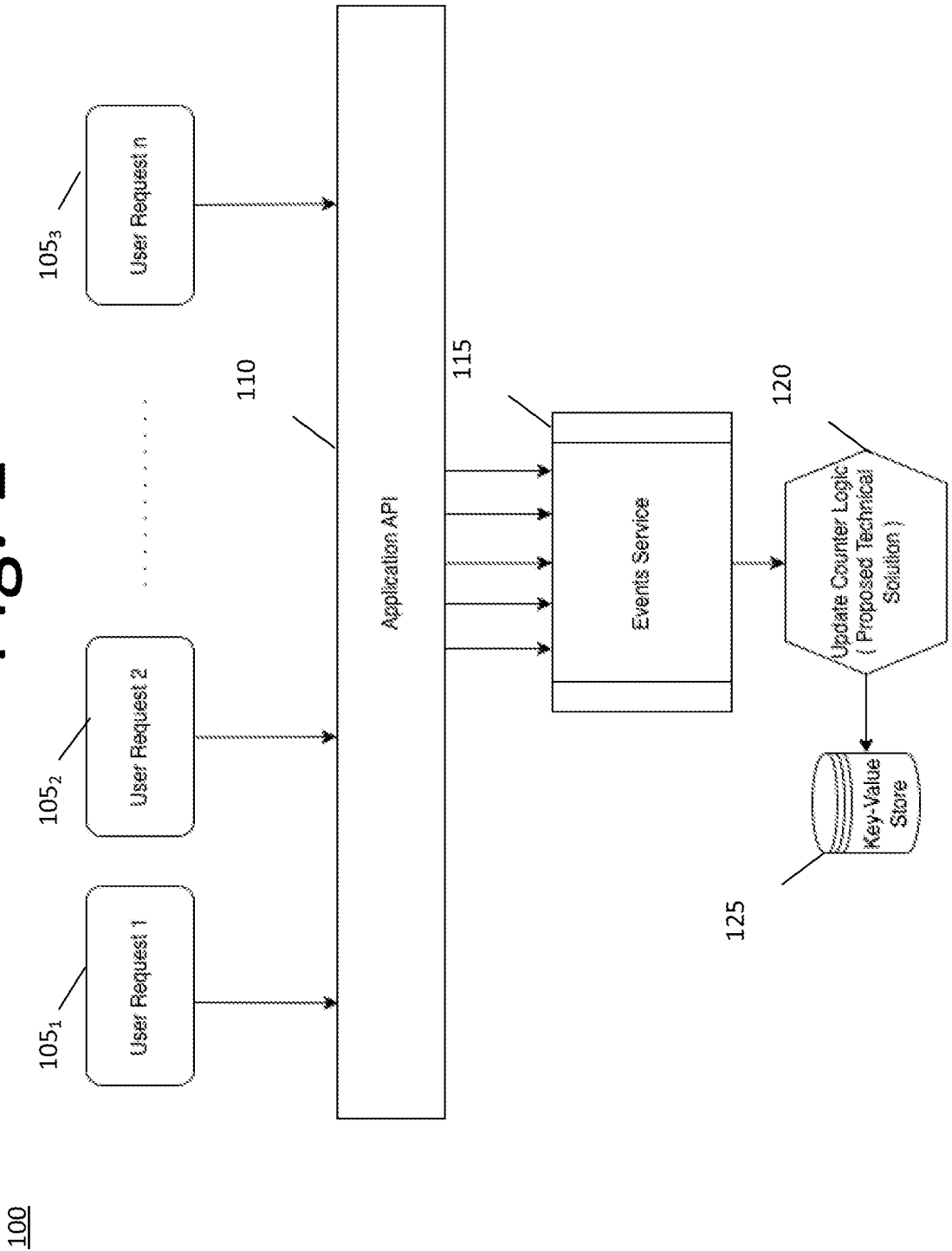
FIG. 1 is a block diagram illustrating a functional use case system configured to perform an auto expiring multi-tenant multi-entity sliding window event counter, according to an embodiment of the present invention.

FIG. 1 is a block diagram illustrating a functional use case system 100 configured to perform an auto expiring multi-tenant multi-entity sliding window event counter, according to an embodiment of the present invention.

In some embodiments, a functional use case is of a user action, such as contact creation or contact update, on the CRM application. This functional use case conditionally triggers the automation events, thereby updating relevant event counters for the tenant account associated with the triggered automations.

User Request 1 to n (see $105_1$ to $105_N$) refers to user actions on the CRM application that will invoke application API 110 to perform some CRUD operation on the records available in the CRM application. These CRUD operations get evaluated by a module (i.e., events service 115) to determine if any of the configured custom workflow automation actions needs to be triggered. If one or more of these triggers (e.g., user CRUD actions) satisfy the custom workflow automation configurations, then a corresponding automation action gets executed and an update counter logic 120 is invoked making the necessary updates in key value 125 store for the action/event counts.

Figure 2:
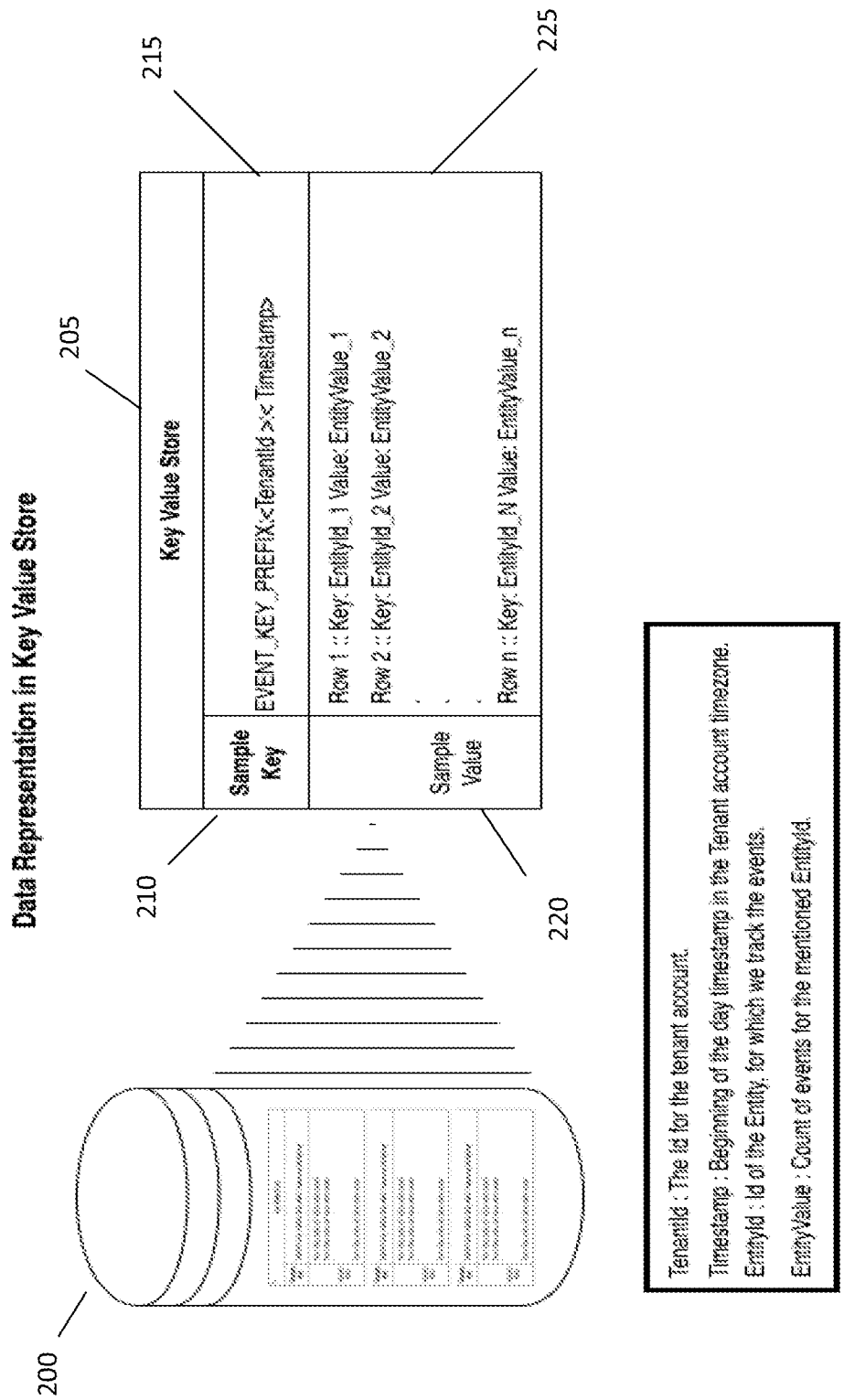
FIG. 2 is a diagram illustrating a data representation of a database having a key value store, according to an embodiment of the present invention.

FIG. 2 is a diagram illustrating a data representation of a database 200 having a key value store, according to an embodiment of the present invention. In some embodiments, database 200 may include a key value store 205. Key value store may include a sample key 210, and under each sample key 210, a sample value 220 may be assigned.

Sample key 210 and sample value 220 in some embodiments represent the key value pair for a tenant for a day across all the multiple custom workflow automations/entities the tenant has configured. Sample key 210 represents the high level key for the tenant_id and the sample key is generated dynamically for each tenant taking into account the tenant_id and timestamp representing the tenant time zone resulting in a string value like EVENT_KEY_PREFIX: <TenantId>:<Timestamp> 215. Also included in a separate column is a sample value 220 for sample key 210. Sample value 225 is a hash data structure, which is a key value structure. The key in the hash represents the ID of the entity (EntityId_1 . . . EntityId_N) and value (EntityValue_1 . . . EntityValue_N) of the hash represents the count being stored for the entity 225.

To summarize, a key value store may save a high level key that uniquely identifies a tenant ID along with the beginning of the day timestamp for the tenant time zone and the value for the high level key may store the entity—event count mapping as a hash inside. See, for example, FIG. 5 and FIG. 6, for a more detailed explanation.

Figure 3:
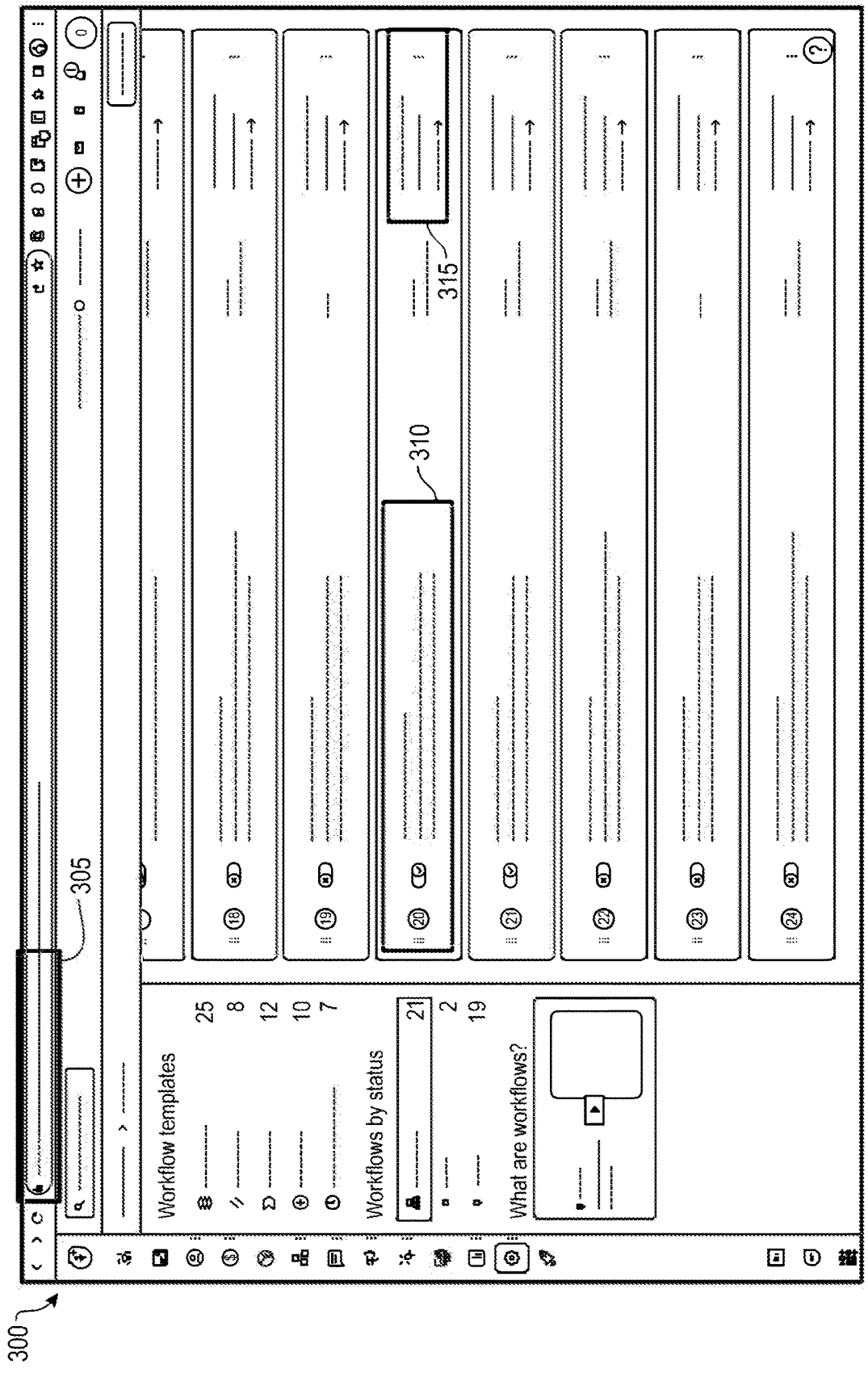
FIG. 3 is a graphical user interface (GUI) illustrating an user interface showing a tenant identification (ID), entity ID, and an aggregated event counter, according to an embodiment of the present invention.

FIG. 3 is a GUI 300 illustrating an user interface showing a tenant identification (ID), entity ID, and an aggregated event counter, according to an embodiment of the present invention. In FIG. 3, GUI 300 shows a functional use case of the proposed multi-tenant multi-entity sliding window event counter, which solves for an event execution audit feature on the Freshsales® CRM software. Reference 305 shows a tenant subdomain, which is interpreted as the tenant identifier (TenantID) and which is used to demarcate the tenants in the multi-tenant Software as a Service (SAAS) application. Entity_Id 310 is an identifier for the entity, which can be mapped to an internal ID for each line item of the entity in the list.

Reference 315 shows aggregated event counts for each of the entities for the last seven days. This metric is retrieved from the proposed multi-tenant multi-entity sliding window event counter. The data setting and data retrieval flow will be explained in more detail below.

Figure 4:
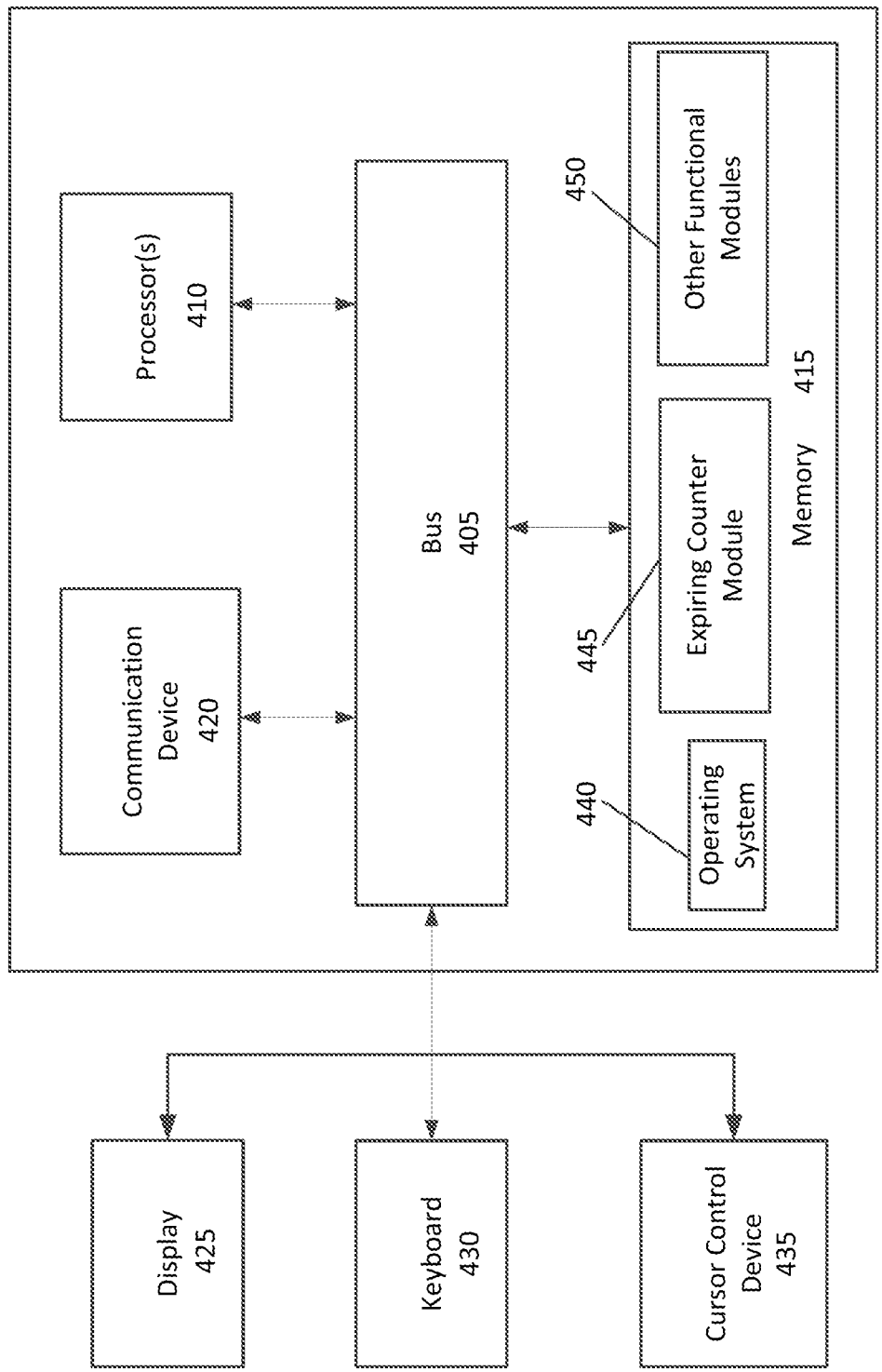
FIG. 4 is a block diagram illustrating a computing system configured to perform an auto expiring multi-tenant multi-entity sliding window event counter, according to an embodiment of the present invention.

FIG. 4 is an architectural diagram illustrating a computing system 400 configured to perform an auto expiring multi-tenant multi-entity sliding window event counter, according to an embodiment of the present invention. In some embodiments, computing system 400 may be one or more of the computing systems depicted and/or described herein. Computing system 400 includes a bus 405 or other communication mechanism for communicating information, and processor(s) 410 coupled to bus 405 for processing information. Processor(s) 410 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 410 may also have multiple processing cores, and at least some of the cores may be configured to perform specific functions. Multi-parallel processing may be used in some embodiments. In certain embodiments, at least one of processor(s) 410 may be a neuromorphic circuit that includes processing elements that mimic biological neurons. In some embodiments, neuromorphic circuits may not require the typical components of a Von Neumann computing architecture.

Computing system 400 further includes a memory 415 for storing information and instructions to be executed by processor(s) 410. Memory 415 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 410 and may include volatile media, non-volatile media, or both. The media may also be removable, non-removable, or both.

Additionally, computing system 400 includes a communication device 420, such as a transceiver, to provide access to a communications network via a wireless and/or wired connection. In some embodiments, communication device 420 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 420 may include one or more antennas that are singular, arrayed, phased, switched, beamforming, beamsteering, a combination thereof, and or any other antenna configuration without deviating from the scope of the invention.

Processor(s) 410 are further coupled via bus 405 to a display 425, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 425 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 430 and a cursor control device 435, such as a computer mouse, a touchpad, etc., are further coupled to bus 405 to enable a user to interface with computing system. However, in certain embodiments, a physical keyboard and mouse may not be present, and the user may interact with the device solely through display 425 and/or a touchpad (not shown). Any type and combination of input devices may be used as a matter of design choice. In certain embodiments, no physical input device and/or display is present. For instance, the user may interact with computing system 400 remotely via another computing system in communication therewith, or computing system 400 may operate autonomously.

Memory 415 stores software modules that provide functionality when executed by processor(s) 410. The modules include an operating system 440 for computing system 400. The modules further include an auto expiring counter module 445 that is configured to perform all or part of the processes described herein or derivatives thereof. Computing system 400 may include one or more additional functional modules 450 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 5:
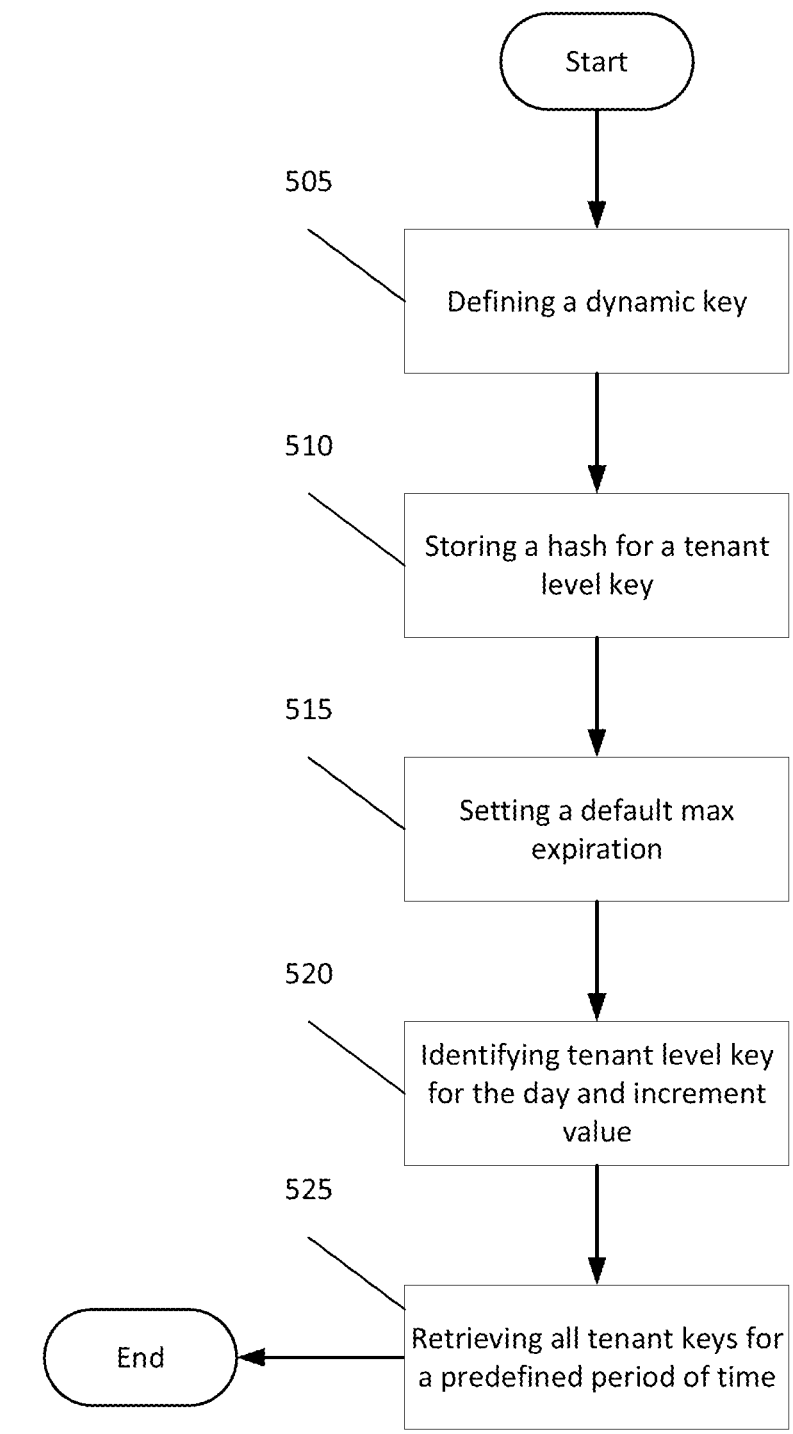
FIG. 5 is a flow diagram illustrating a method for performing an auto expiring multi-tenant multi-entity sliding window event counter, according to an embodiment of the present invention.

FIG. 5 is a flow diagram illustrating a method 500 for performing an auto expiring multi-tenant multi-entity sliding window event counter, according to an embodiment of the present invention. In some embodiments, method 500 includes defining a dynamic key for a key value pair, which is created for a tenant per day at 505. In these embodiments, a dynamic Redis key is defined, such as 'EVENT_EXECUTION_AUDIT:%{tenant_id}:%{time}'. Tenant ID in these embodiments is the account ID, and the time is the timestamp in the account time zone (i.e., time at the beginning of the day in the account's time zone). For example, when an event, such as a workflow automation action (e.g., contact update) occurs, the account ID and account time zone where the event occurred is identified and is used for the dynamic key generation. This generated key is referred hereafter as the tenant level key for the day for the tenant. The tenant level key is a uniquely identifiable key for the account for the day, and as explained, it is a templated string that uses the tenant_id and the beginning of the day timestamp to get it generated.

As per the defined tenant level key, its value is supposed to be another key-value pair, which is essentially a hash and that can store the entity_id as the key and event count as the value. A sample generated tenant level key="EVENT_KEY_PREFIX:100:1694624400" where 100 is the tenant_id and 1694624400 is the start of day timestamp in the tenant's time zone. A sample value for the above key={
  1000: 45000,
  2000: 25000,
  3000: 95000
}
In this example, keys 1000, 2000, 3000 represent the entity id (e.g., Automation ID) and values 45000, 25000, 95000, etc. represent the entity event counts.

At 510, method 500 includes storing a hash for the tenant level key as generated in 505. The hash may have the Entity ID (e.g., Automation Id) as a key and execution count as the value. In this example, the hash is the key value pair, where the key will be the automation ID (Entity ID) and the value will be the execution counter. Let us say, from automation ID 1000 in account ID 100, there is an update. The entry will appear as the execution audit for account ID 100 for Monday beginning of the day for automation ID 1000, and the value for the key automation ID 1000 inside the tenant level key 'EVENT_EXECUTION_AUDIT:%{tenant_id}:%{time}' is incremented with a value of '1', and keeps incrementing accordingly. If there is an automation with automation ID 3000 in an account with ID 300 for another event, then the value for the hash key, automation ID 3000 inside the tenant level key for account_id 300 is incremented by 1 and so forth. See, for example, FIGS. 6 and 7, for a more detailed explanation.

At 515, method 500 includes setting a default max expiration for a predefined period of time (e.g., 7 days, 14 days, etc.) to the tenant level key. This way, the counter ceases to exist after the expiration of the predefined period of time. At 520, for any valid event triggering an automation of a tenant, the tenant level key is identified for the day and the value is incremented for the automation ID. The automation ID is the key in the hash in this embodiment. See, for example, FIG. 7 for a more detailed explanation of this step.

At 525, for the retrieval of the sum of counts over the predefined period of time per tenant automation, all tenant level keys are retrieved for the predefined period of time, initiate a Lua script to Redis and retrieve the value of the tenant level keys, and perform an iteration on each tenant level keys and sum the values per key for all repeating tenant level keys. See, for example, FIG. 8 for a more detailed explanation of this step.

Figure 6:
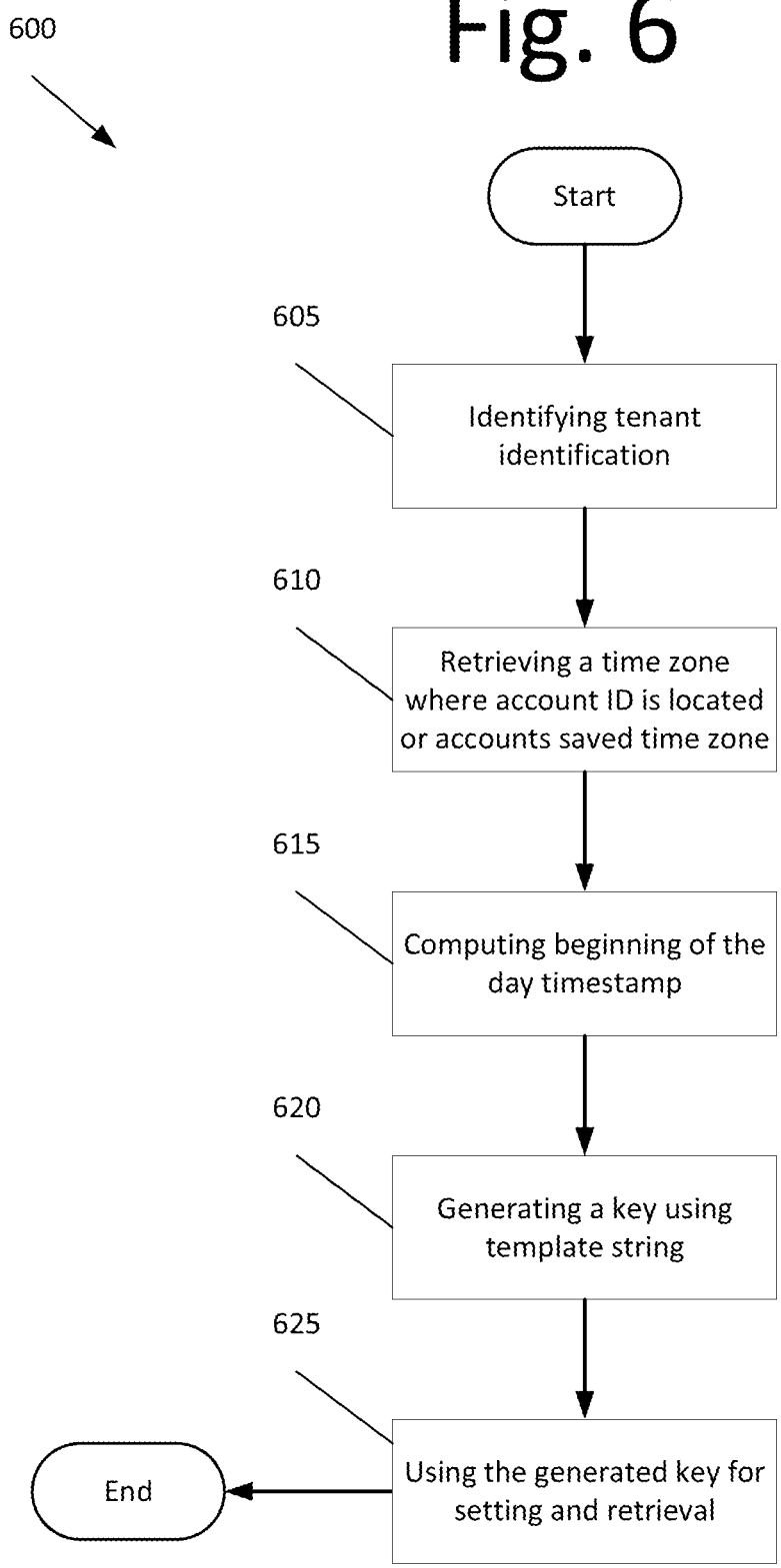
FIG. 6 is a flow diagram illustrating a method for adding a key definition, according to an embodiment of the present invention.

FIG. 6 is a flow diagram illustrating a method 600 for adding a key definition according to an embodiment of the present invention. In some embodiments, method 600 includes identifying a tenant ID (or account ID) at 605. At 610, method 600 includes retrieving the time zone of where the account ID is located or the saved time zone as per account configuration. At 615, method 600 includes computing the beginning time of day timestamp in the account time zone. At 620, method 600 includes generating a key using a template string, e.g., substitutes variables in a template string. For example, the tenant level unique key definition for the day is based on a string template. The string template is nothing but a variable string with substitutable placeholders for account ID and timestamp as shown below:

"EVENT_KEY_PREFIX:<tenant_id>:<start_of_day_timestamp_in_tenant_tz>"

where the tenant_id retrieved at 605 and timestamp calculated at 615 is substituted, appropriately. This provides the tenant level key for the tenant for the day. In this example, the generated key is "EVENT_KEY_PREFIX:100:1694624400" where tenant_id is 100 and start_of_day_timestamp_in_tenant_tz is 1694624400).

At 625, method 600 includes using the generated key for data setting and retrieval. This generated key serves as the tenant level key for the day and holds the event counters for all the workflow automations (Entities) in the account. Detailed explanation of data setting and data retrieval is described in more detail below with respect to FIGS. 7 (data setting) and 8 (data retrieval).

Figure 7:
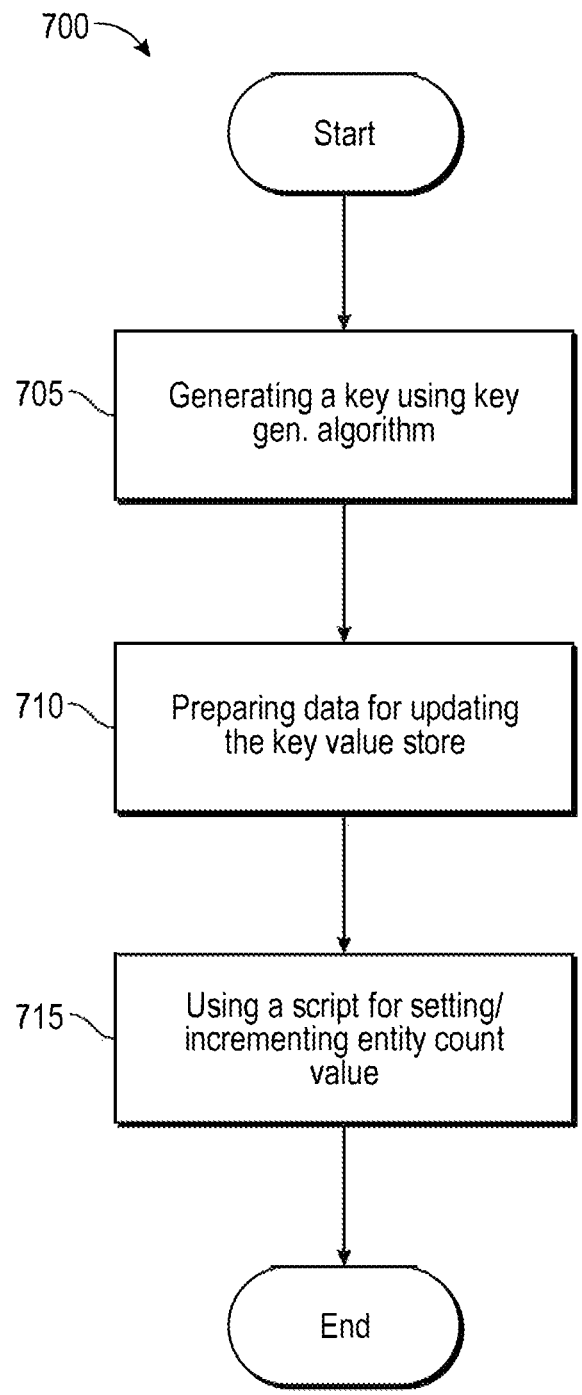
FIG. 7 is a flow diagram illustrating a method for setting a value for the above key on the key value store (e.g., Redis key), according to an embodiment of the present invention.

FIG. 7 is a flow diagram illustrating a method 700 for setting a value in the Redis key, according to an embodiment of the present invention. In some embodiments, method 700 begins at 705 with generating a key using the key generation algorithm shown in method 600 of FIG. 6. At 710, method 700 includes preparing data for updating the key value store via a script. In one example, for each event from the workflow automation entity, the system identifies the corresponding tenant level key and updates the value for the entity_id inside the hash value. However, when it comes to high volume events where numerous events execute for the same entity/automation in a fraction of seconds, the aggregate updates that go into the key value store are batched as the aggregate updates optimize the writes made to the key value store.

Continuing with step 710, for high volume events, the aggregated counts are stored in memory as a hash, and upon completion of the batch or high volume event execution, this hash is serialized and passed as a parameter to a script. The script may then update the values in the key value store. This process of batching the database writes to the key value store is represented in 710. This approach reduces the number of writes to the data store, and still ensures the accuracy of the data such that the expected data persistence is accurately achieved in a batched manner.

The second advantage is that the prepared data of the batch may be binary serialized using serializers, such as MessagePack, and can ensure optimal performance for the data store I/O interactions. For example, the prepared batched data, hash variable event_counts stores the entity id and the count of events occurred during the batch execution in memory. During post batch execution, a request is submitted to the key value store with event_counts data as parameters and are updated in the tenant level key for the day against the corresponding entity_id. In this example, event_counts={1000: 35000, 2000: 45000} where keys 1000, 2000 represent the entity_id and values 35000, 45000 represent the event count during the batch execution of events or workflow automations. Variable event_count may grow larger in size and binary serialization may be used for better performance on network transfer time while the data is written into the key value data store. From a pseudocode perspective, this look like serialized_event_counts=binary_serialize (event_counts) where event_counts is a hash of EntityId as key and EntityCountValue as values from the current batch of event triggers.

At 715, method 700 includes using a script (e.g., Lua) for setting/incrementing the entity count value for the account ID in the generated tenant key of the key value store. More specifically, local variables stored_data and event_counts may be initialized in the script. The variable stored_data is used to fetch and store the current data available in the data store for the given tenant level key, and the variable event_counts stores the new event counts passed as parameters to the script to get new event counts updated in the data store.

In some embodiments, the script is invoked by passing the tenant_level_key, event_count_hash and expiry_timestamp as parameters. tenant_level_key is the same high level key as generated in method 600 of FIG. 6. event_count_hash is the batched data as defined in step 710 of FIG. 7. expiry_timestamp is the timestamp of expiry, which is the timestamp after 7 days or 14 days based on the data retention expectations. With the tenant_level_key, the data store is queried to see if the key exists. If it exists, the stored key is loaded into a local variable called stored_data. stored_data is a hash with entity_id as the key and event_count as the value. event_count_hash has the new event counts that need to be incremented to the already saved data set. The event_count_hash parameter is deserialized and is assigned to event_counts. event_counts is iterated, and for each entity id in event_counts, the value in the stored_data variable is incremented with the value in event_counts variable. In the event that the tenant_level_key did not exist already, the key with the event_counts hash is initialized and the expiry is set as the computed expiry_timestamp is passed to the script.

Figure 8:
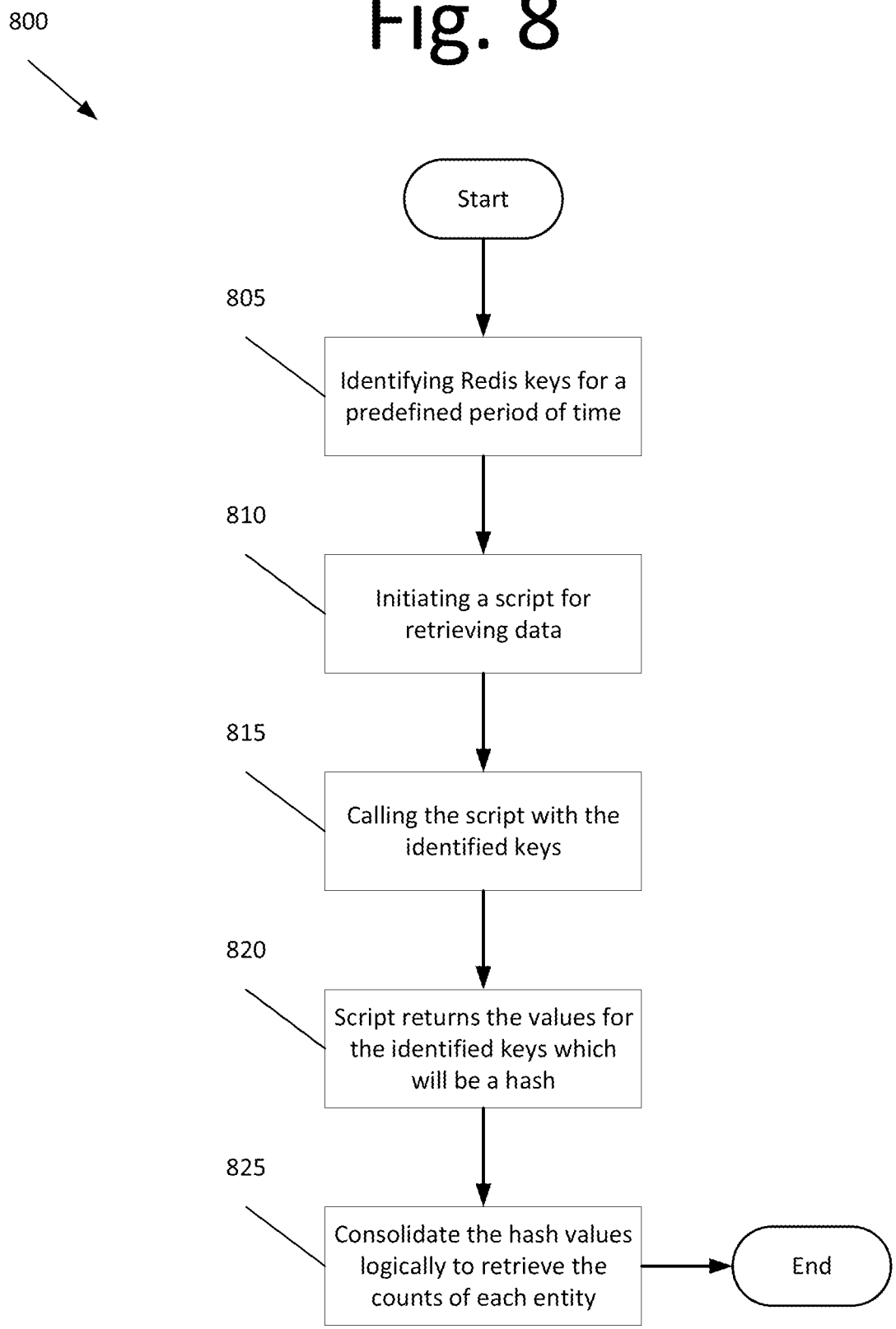
FIG. 8 is a flow diagram illustrating a method for retrieving and aggregating data from the stored keys (e.g., Redis keys) for the predefined period of time, according to an embodiment of the present invention.
Figure 9:
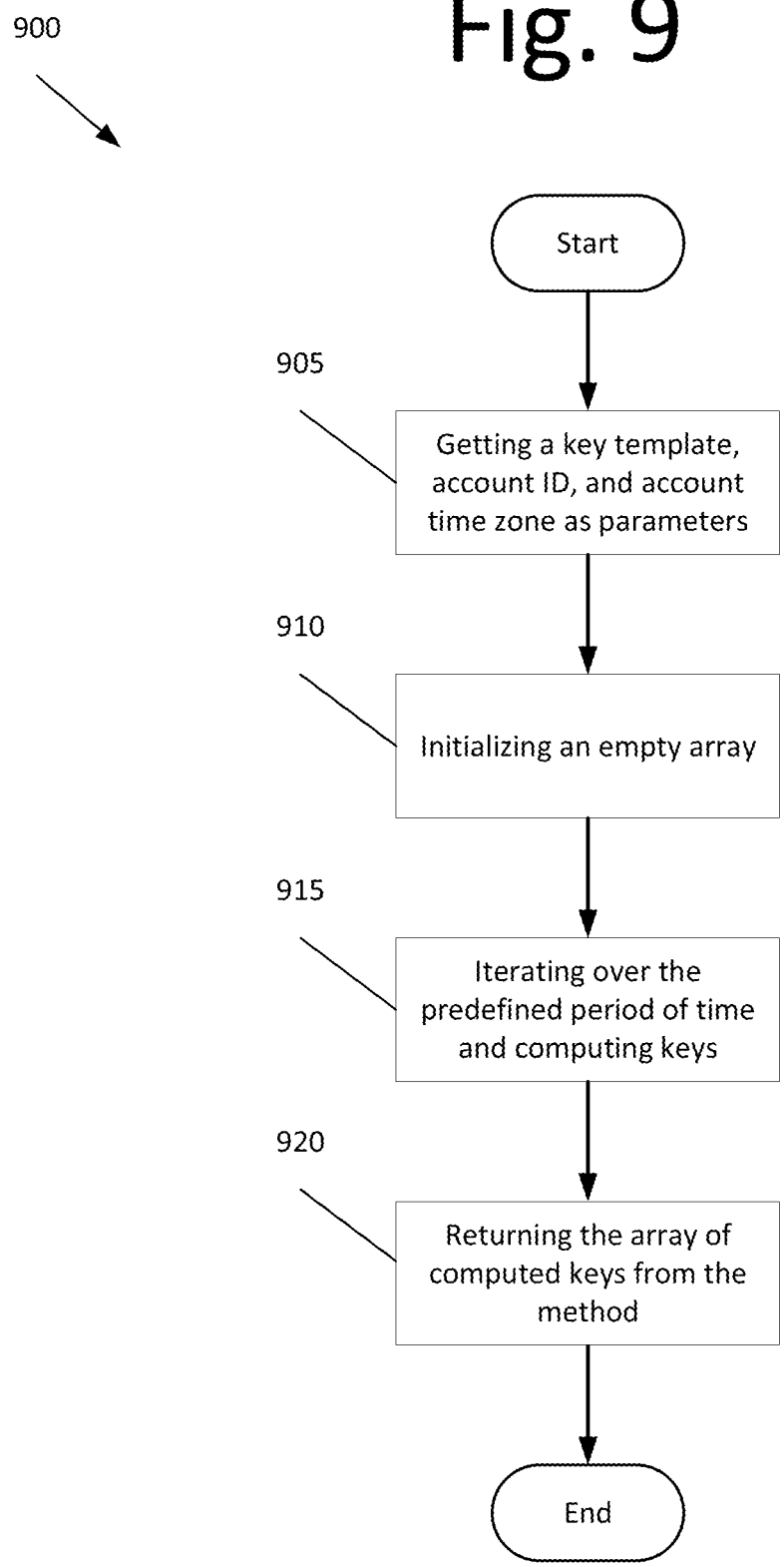
FIG. 9 is a flow diagram illustrating a method for performing a function to get keys in range for the predefined period of time, according to an embodiment of the present invention.

FIG. 8 is a flow diagram illustrating a method 800 for retrieving and aggregating data from Redis keys for the predefined period of time, according to an embodiment of the present invention. In some embodiments, method 800 begins at 805 with identifying Redis keys (Tenant level keys) for the predefined period of time using the algorithm proposed in FIG. 9. Method 900 of FIG. 9 shows an algorithm to get the tenant level keys in range for the predefined period of time. Using method 900, the list of all Tenant level keys for the expected date range is fetched.

Returning to FIG. 8, at 810, method 800 includes initiating a Lua script for retrieving data from the identified Redis keys. In these embodiments, the result container/variable is initialized, performs an iteration over tenant level keys for the date range collated in 805 and retrieves the data for those keys from the Redis datastore, and returns a result. At 815, method 800 includes calling a Lua script with the identified keys from step 805, and at 820, script fired at 815 returns the values which will be a hash for the identified keys from 805. At 825, the method consolidates the retrieved hash values logically to retrieve the counts of each entity. In these embodiments as per 825, perform an initialization of a hash to store aggregated results with a default value of 0, iterate over each entity event in the entity event history, which is retrieved from the data store at 815. For each entity event pair of Entity ID and count, the result hash is updated. The result may then contain the aggregated data for each account over the predefined period of time.

FIG. 9 is a flow diagram illustrating a method 900 for performing a function to get keys in range for the predefined period of time, according to an embodiment of the present invention. In some embodiments, method 900 begins at 905 with getting a key template, account ID, and account time zone as parameters. Key template as previously explained at step 620 of FIG. 6 is a variable string with substitutable placeholders for account id and timestamp as shown below "EVENT_KEY_PREFIX:<tenant_id>:<start_of_day_timestamp_in_tenant_tz>".

Parameters account ID and account time zone are used to substitute in the above string key template. At 910, method 900 includes initializing an empty array to store the generated key names, and at 915, method 900 includes iterating over the predefined period of time and computing the keys based on the beginning of the day timestamps for the last n days. This is a direct mathematical computation where the timestamp for today's beginning of the day in the account time zone is identified and 86400 seconds (24*60*60) is subtracted from today's timestamp to get yesterday's timestamp and likewise for the other previous days. At 920, method 900 includes returning an array of keys as computed in 915.

The process steps performed in FIGS. 5-9 may be performed by a computer program, encoding instructions for the processor(s) to perform at least part of the process(es) described in FIGS. 5-9, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 410 of computing system 400 of FIG. 4) to implement all or part of the process steps described in FIGS. 5-9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method performing an auto expiring multi-tenant multi-entity sliding window event counter, the method comprising:
   defining, by at least one processor, a dynamic key for a key value pair uniquely created for a tenant per day in a key value store;
   storing, by the at least one processor, a hash associated with the dynamic key, wherein the hash comprises an entity identification (ID) as a key and an entity count as a value;
   upon a valid event trigger for an entity of the tenant, identifying, by the at least one processor, a tenant level key for a day and incrementing the value of the entity ID;
   retrieving, by at least one processor, a sum of counts over the predefined period of time for each entity identified with the entity ID for the tenant; and
   performing, by the at least one processor, automated key deletion/cleanup after expiration of the predefined period of time set as expiry for the key.

2. The computer-implemented method of claim 1, wherein the entity is an automation and the entity ID is an automation ID.

3. The computer-implemented method of claim 1, further comprising:
   identifying a tenant ID associated with the tenant;
   retrieving a time zone of where the tenant ID is located or a saved time zone as per account configuration;
   computing a beginning time of day timestamp in a time zone of where the tenant ID is located;
   generating a key using a template string; and
   using the generated key for data setting and data retrieval, wherein the generated key serves as the tenant level key for a day and holds event counters for all workflow automations in a tenant account.

4. The computer-implemented method of claim 3, further comprising:
   generating the key using a key generation algorithm;
   preparing data for updating a key value store via a script; and
   using the script for setting/incrementing an entity count value for the tenant ID in the generated tenant key of the key value store.

5. The computer-implemented method of claim 4, further comprising:
   for each event from a workflow automation entity, identifying a corresponding tenant level key and updating a hash value for the entity ID, or
   for high volume events where numerous events execute for same entity/automation in a fraction of second, batching a plurality of updates to be saved in the key value store as aggregate updates such that writes made to the key value store are optimized.

6. The computer-implemented method of claim 5, wherein the batching the plurality of updates comprises
   for the high volume events, storing aggregated counts in memory as hash values;
   upon completion of the batching or high volume event execution, serializing the hash values and passing the serialized hash values as a parameter to the script; and
   updating the hash values in the key value store.

7. The computer-implemented method of claim 4, wherein the using the script for setting/incrementing the entity count value comprises
   initializing local variables comprising stored data and event counts in the script;
   using stored data local variable to fetch and store current data available in the data store for a given tenant level key; and
   using the event counts local variable to store new event counts passed as parameters to the script to get new event counts updated in the data store.

8. The computer-implemented method of claim 3, further comprising:
   identifying Redis keys for a predefined period of time to retrieve one or more tenant level keys in range for the predefined period of time;
   initiating a script for retrieving data from the identified Redis keys;
   calling the script with the identified keys;

upon calling of the script, returning one or more hash values for each of the identified Redis keys;
consolidating each of the one or more hash values to retrieve counts for each entity.

9. The computer-implemented method of claim 8, wherein the initiating the script for retrieving the data comprises
initializing a result container/variable;
performing an iteration over the tenant level keys for a date range collated;
retrieving data associated with the tenant level keys from the data store; and
returning a result of the retrieved data.

10. The method of claim 8, wherein the consolidating of each of the one or more hash values comprises
performing an initialization of a hash value to store each of the plurality of results with a default value of 0;
iterating over each entity event in an entity event history, wherein the entity event history is retrieved from the data store; and
for each entity event pair of Entity ID and count, the hash value is updated.

11. The method of claim 8, further comprising:
obtaining a key template, account ID, and account time zone as parameters;
initializing an empty array to store generated parameters;
iterating over the predefined period of time and computing the Redis keys based on a beginning of the day timestamps for the last n days; and
returning an array of Redis keys.

12. An apparatus configured to perform an auto expiring multi-tenant multi-entity sliding window event counter, the apparatus comprising:
a set of instructions; and
at least one processor, wherein
the set of instructions are configured to cause the at least one processor to execute
defining a dynamic key for a key value pair uniquely created for a tenant per day in a key value store;
storing a hash associated with the dynamic key, wherein the hash comprises an entity identification (ID) as a key and an entity count as a value;
upon a valid event trigger for an entity of the tenant, identifying a tenant level key for a day and incrementing the value of the entity ID;
retrieving a sum of counts over the predefined period of time for each entity identified with the entity ID for the tenant; and
performing automated key deletion/cleanup after expiration of the predefined period of time set as expiry for the key.

13. The apparatus of claim 12, wherein the set of instructions are configured to cause at least one processor to execute:
identifying a tenant ID associated with the tenant;
retrieving a time zone of where the tenant ID is located or a saved time zone as per account configuration;
computing a beginning time of day timestamp in a time zone of where the tenant ID is located;
generating a key using a template string; and
using the generated key for data setting and data retrieval, wherein the generated key serves as the tenant level key for a day and holds event counters for all workflow automations in a tenant account.

14. The apparatus of claim 13, wherein the set of instructions are configured to cause at least one processor to execute:

generating the key using a key generation algorithm;
preparing data for updating a key value store via a script; and
using the script for setting/incrementing an entity count value for the tenant ID in the generated tenant key of the key value store.

15. The apparatus of claim 14, wherein the set of instructions are configured to cause at least one processor to execute:
for each event from a workflow automation entity, identifying a corresponding tenant level key and updating a hash value for the entity ID, or
for high volume events where numerous events execute for same entity/automation in a fraction of second, batching a plurality of updates to be saved in the key value store as aggregate updates such that writes made to the key value store are optimized.

16. The apparatus of claim 15, wherein the set of instructions are configured to cause at least one processor to execute:
for the high volume events, storing aggregated counts in memory as hash values;
upon completion of the batching or high volume event execution, serializing the hash values and passing the serialized hash values as a parameter to the script; and
updating the hash values in the key value store.

17. The apparatus of claim 14, wherein the set of instructions are configured to cause at least one processor to execute:
initializing local variables comprising stored data and event counts in the script;
using stored data local variable to fetch and store current data available in the data store for a given tenant level key; and
using the event counts local variable to store new event counts passed as parameters to the script to get new event counts updated in the data store.

18. The apparatus of claim 13, wherein the set of instructions are configured to cause at least one processor to execute:
identifying Redis keys for a predefined period of time to retrieve one or more tenant level keys in range for the predefined period of time;
initiating a script for retrieving data from the identified Redis keys;
calling the script with the identified keys;
upon calling of the script, returning one or more hash values for each of the identified Redis keys;
consolidating each of the one or more hash values to retrieve counts for each entity.

19. The apparatus of claim 18, wherein the set of instructions are configured to cause at least one processor to execute:
initializing a result container/variable;
performing an iteration over the tenant level keys for a date range collated;
retrieving data associated with the tenant level keys from the data store; and
returning a result of the retrieved data.

20. The apparatus of claim 18, wherein the set of instructions are configured to cause at least one processor to execute:
performing an initialization of a hash value to store each of the plurality of results with a default value of 0;

iterating over each entity event in an entity event history, wherein the entity event history is retrieved from the data store; and for each entity event pair of Entity ID and count, the hash value is updated.

\* \* \* \* \*